US006611596B1

(12) United States Patent
Cannon et al.

(10) Patent No.: US 6,611,596 B1
(45) Date of Patent: Aug. 26, 2003

(54) SPEAKERPHONE INDICATOR

(75) Inventors: Joseph M. Cannon, Harleysville, PA (US); James A. Johanson, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/358,260

(22) Filed: Jul. 20, 1999

(51) Int. Cl.[7] ............................. H04M 1/00; H04M 9/00
(52) U.S. Cl. ............................. 379/420.01; 379/420.02; 379/164
(58) Field of Search ..................... 379/142.01, 142.04, 379/142.17, 245, 420.01, 420.02, 420.03, 420.04, 352, 164, 156

(56) References Cited

U.S. PATENT DOCUMENTS 5,832,072 A * 11/1998 Rozenblit
5,974,130 A * 10/1999 Sadri et al.

* cited by examiner

*Primary Examiner*—Duc Nguyen
(74) *Attorney, Agent, or Firm*—William H. Bollman

(57) ABSTRACT

Apparatus and method to transmit a speakerphone active indication signal to another party over a telephone line upon use of a speakerphone feature, and to transmit a speakerphone inactive indication signal upon cessation of the speakerphone feature. A speakerphone indication transmit module provides an audible or data signal relating to the activation or inactivation of a speakerphone feature to a receiving party's telephone system, which either audibly confirms use of the speakerphone at the opposite end, and/or displays a speakerphone active indication, e.g., on an LED or LCD display. The speakerphone indication active and inactive signals can be, e.g., a single tone, a DTMF tone, FSK signaling, or ADSL signaling.

25 Claims, 2 Drawing Sheets

SPEAKERPHONE INDICATOR

BACKGROUND OF THE INVENTION

1. Field of the Invention

This invention relates generally to a telephone system. More particularly, it relates to a telephone system having a speakerphone feature which is capable of indicating to another party over the telephone line that the speakerphone feature is active.

2. Background of Related Art

The use of speakerphones on telephone systems has become more and more popular due to the proliferation of telecommunications technology and the conducting of business via telephone systems. Many people desire to use a speakerphone feature, e.g., to conduct a telephone conference with: more than one participant using the single speakerphone, allowing everyone in the room at the time to participate in the telephone conference. However, a person may walk into a room while the speakerphone feature is active, allowing them to hear the conversation unbeknownst to the other party on the telephone line. Moreover, the person using the speakerphone may not identify all persons within earshot of the speakerphone to the person called. In either case, it may be the case that the other party may not know if another person or persons are within earshot and able to hear both sides of the telephone call.

In some instances, the sound of the received audio from a speakerphone is sufficiently distinctive that the other party may deduce the use of a speakerphone without requiring an announcement of such from the party using the speakerphone. However, many people may not be able to discern such speakerphone use. For instance, those who are hard of hearing may not immediately identify the sound as that coming from a speakerphone, leaving themselves vulnerable to a possible embarrassing moment when the unidentified person hears portions of the conversation which the unknowing party would not have intended for that unidentified person to hear.

Moreover, due to improved technology and components in modern telephone systems, the sound quality and echo suppression is improving to the point where audible detection: of speakerphone usage is becoming more and more difficult. Thus, any unidentified (and likely non-participating) person could be present in the immediate vicinity of the speakerphone to hear the telephone conversation without the other party's knowledge, again leaving vulnerable the possibility that the other party might reveal or otherwise disclose confidential and/or private information that was intended only for the person using the speakerphone and not other persons which may be present.

Accordingly, there exists a need for an improved telephone system and method which avoids the embarrassing possibility of a conversation being unknowingly overheard by others within earshot of a speakerphone.

SUMMARY OF THE INVENTION

In accordance with the principles of the present invention, a telephone system comprises a speakerphone, and a speakerphone indication transmit module adapted to cause a speakerphone indication active signal to be transmitted over a telephone line to another party upon activation of the speakerphone.

A method for transmitting a status of speakerphone feature usage by a first party to a second party of a telephone call upon use of a speakerphone feature in accordance with another aspect of the present invention comprises establishing a telephone call between a first party and a second party. The speakerphone feature is activated on a telephone system used by the first party, and the speakerphone active indication signal is transmitted to the called party.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
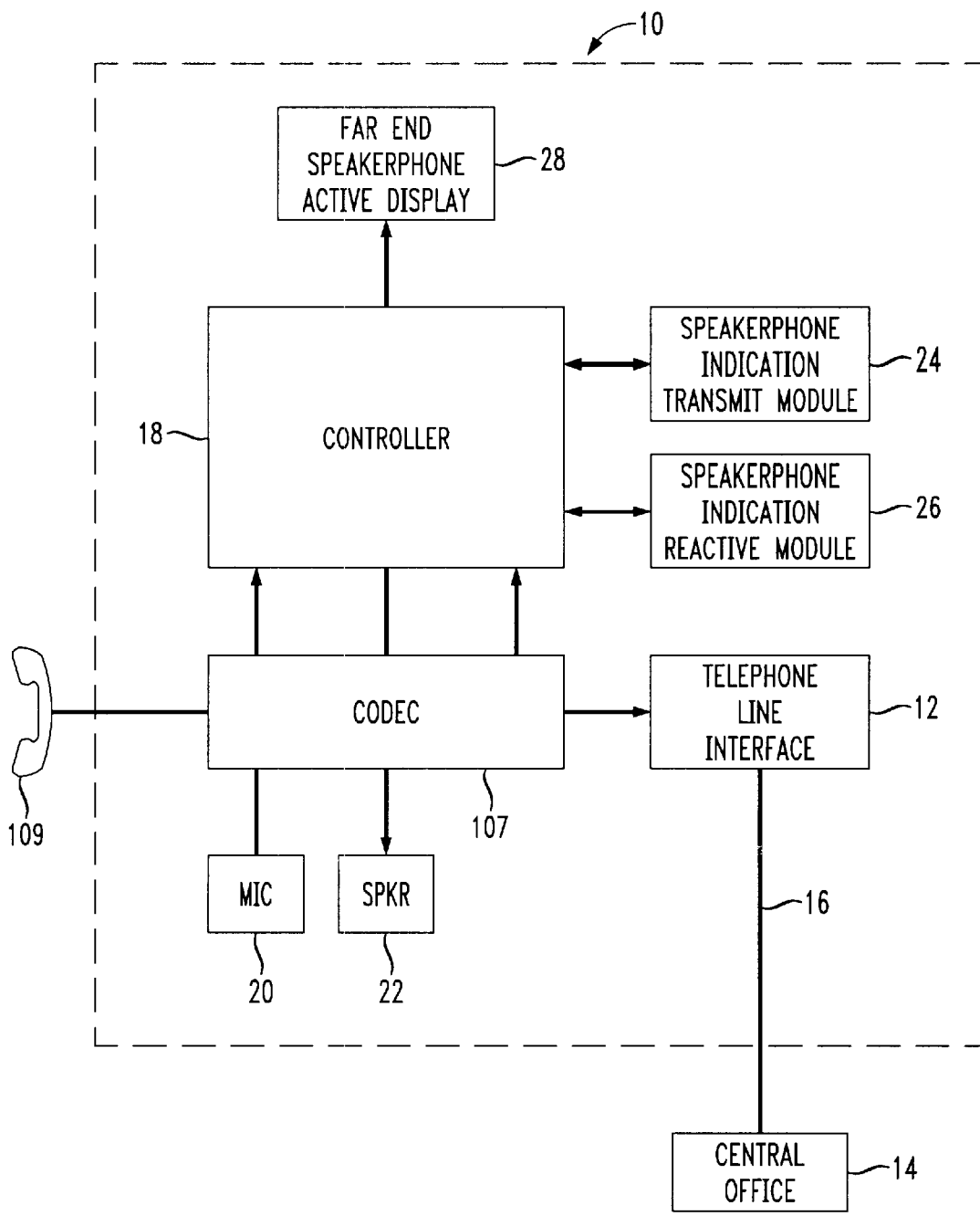
FIG. 1 illustrates an embodiment of a telephone system having a speakerphone feature which provides a speakerphone indication active signal to a party over a telephone line, and which is capable of displaying a visual speakerphone active signal received from another party, in accordance with the principles of the present invention.

The present invention provides a telephone system and method of having a speakerphone feature indicate over a telephone line to another party when they are using a speakerphone feature. Such indication is preferably updated occasionally or periodically, e.g., every 15 seconds, every 30 seconds, or every minute, etc., using a speakerphone indication inactive signal. The speakerphone indication active signal is transmitted over the telephone line to an opposite party when the speakerphone feature of their telephone is enabled, and a speakerphone indication inactive signal is transmitted over the telephone line when the speakerphone feature is disabled.

In accordance with the principles of the present invention, the speakerphone indication active signal is sent to the opposite party, e.g., in the form of a tone and/or in the form of a data signal sent in or out of band when the speakerphone feature of the telephone system is being used. For instance, the speakerphone indication active and inactive signals can be sent via a single tone, a dual tone multi-frequency (DTMF) tone, and/or by frequency shift keying (FSK) information. Furthermore, the speakerphone indication inactive signal is preferably sent to the opposite party in a similar form (e.g., single tone, DTMF, and/or FSK) when the speakerphone feature of the relevant telephone system is no longer activated. Preferably, a receiving telephone will reset its indication (e.g., LED, LCD, TONE, etc.) that a speakerphone is active at the other end of the telephone line whenever placed in an on-hook condition.

The telephone system of the present invention allows another party to a telephone conversation to determine whether or not they are speaking with a person currently using a speakerphone feature, allowing them to tailor their telephone conversation accordingly. If the receiving party does not have the feature, then the indication is not utilized and does not otherwise affect the telephone conversation.

In accordance with the present invention, use of a speakerphone feature by one party can be indicated to an opposite (e.g., called or calling) party during the telephone conversation, either audibly and/or visually. For instance, an audible tone may be output by the telephone using the speakerphone feature such that any or all parties to the conversation hear the tone. Moreover, an audible or other tone or data signal may be used to provide an inaudible signal indicating the activation or inactivation of the speakerphone feature to the opposite party's telephone. The speakerphone indication data signal, active or inactive, may illuminate or extinguish, respectively, an appropriate LED or LCD.

If the speakerphone feature becomes disabled during the conversation, the speakerphone preferably indicates such cessation to the other party. For instance, in the case of Ian audible speakerphone indication signal, the audible indication will cease upon cessation of the speakerphone feature. In the case of a visual speakerphone indication in response to the receipt of a speakerphone indication data signal, the visible indication will extinguish or otherwise indicate the inactivation of the speakerphone at the opposite end of the telephone call.

Preferably, the speakerphone indication is automatically reset by the receiving telephone upon termination of the relevant telephone call. Thus, upon termination of a telephone call, transmission of a speakerphone inactivation signal is not necessary.

FIG. 1 illustrates an exemplary telephone system, indicated generally at 10, having a speakerphone feature which is capable of indicating to an opposite party the activation and inactivation of the speakerphone feature while engaged in a conversation.

In particular, in the embodiment of FIG. 1, the telephone system 10 includes at least one telephone line interface 12 for interconnection with a telephone company central office 14 via a telephone line 16. The telephone line interface 12 interconnects the telephone line 16 to a controller 18. The controller 18 controls the overall functions of the telephone answering device 10, and may be any suitable processor, e.g. a microprocessor, a digital signal processor (DSP), or a microcontroller.

The telephone system 10 further, includes a speakerphone capability including audio echo cancellation (AEC) as is known in the art. For instance, a microphone 20 and a speaker 22 are connected to a suitable codec 107, which in turn is connected to the controller 18. The microphone 20 and the speaker 22 (together with a suitable program module in the controller 18) allow the user of the telephone system 10 to conduct a speakerphone telephone conversation by speaking into the microphone 20 and listening through the speaker 22. The telephone system 10 may also include a handset 109 for non-speakerphone operation.

In accordance with the principles of the present invention, the telephone system 10 illustrated in FIG. 1 further includes a speakerphone indication transmit module 24 and a speakerphone indication receive module 26.

The speakerphone indication transmit module 24 is activated upon activation of the speakerphone function of the telephone system 10. Upon activation, the speakerphone indication transmit module 24 causes an appropriate speakerphone indication active signal to be transmitted over the telephone line 16 via the telephone line interface 12.

The particular form of the speakerphone indication active signal may be audible (e.g., a single or dual tone, or FSK signaling), or may be inaudible (e.g., ADSL). In any event, upon activation (and preferably again upon deactivation), the speakerphone indication active signal (and inactive signal) are generated using appropriate algorithms within the speakerphone indication transmit module 24.

For instance, in an analog connection, i.e., a non-modem type connection, either a dual tone multiple frequency (DTMF) generator can be included in the speakerphone indication transmit module 24, or a Frequency Shift-Keying (FSK) modulator can be included in the speakerphone indication transmit module 24 to generate FSK data. In either of these cases, the speakerphone active indication signal and the speakerphone inactive indication signal will likely be audible to either or both the calling party and the called party.

As one example, a DTMF tone alone may serve as the speakerphone active indication signal, once at the beginning of the telephone call, occasionally, or periodically, e.g., every thirty (30) seconds, every one (1) minute, etc. The speakerphone active indication signal can be activated for only a short period of time, e.g., for two hundred (200 mS) milliseconds, depending on the desires of the user. If the speakerphone indication active signal is audible, the speaker of the speakerphone telephone system can be muted for the short period of time that the speakerphone active indication signal is sent by the speakerphone indication transmit module 24 to reduce the annoyance to the speakerphone user. However, the receiving party's telephone system does not have prior knowledge of the speakerphone active indication signal, and thus will likely have to allow at least a portion of the speakerphone active indication signal to be heard by the receiving party. It is possible to use a signal similar to a CAS tone used in Caller ID applications to alert a receiving device regarding the following transmission of a speakerphone indication signal.

As described above, a speakerphone active indication signal can be transmitted "in-band", i.e., within audible frequencies, or "out-of-band", outside the audible frequencies. In-band transmission techniques of the speakerphone active indication signal include DTMF or FSK. Out-of-band techniques include ADSL. For instance, if a digital connection is available on the telephone line, either in lieu of the analog voice connection, e.g., when using a modem, or when available together with (and out of hearing range of) the analog voice connection, e.g., ADSL, then the speakerphone active indication signal can be simply transmitted as a bit, word, or other representative status from the speakerphone telephone to the telephone system of the calling party.

In the disclosed embodiment, the telephone system 10 further includes a receiving end speakerphone active display 28 for visibly indicating whether the other party is utilizing a speakerphone feature of their telephone system.

The speakerphone indication receive module includes suitable software and/or hardware to receive, decode, and output to the receiving end speakerphone active display 28 that the other party's speakerphone is active.

Preferably, the telephone system 10 will be set by default at the initiation of a telephone call, whether as a calling party or as a called party, to indicate that the far end party is not using their speakerphone function until a suitable speakerphone indication active signal is received. Thus, the receiving end speakerphone active display 28 will initially be extinguished or otherwise indicate a non-speakerphone use by the far end party. Alternatively, or additionally, a speakerphone indication inactive signal can be transmitted to the party at the other end of the telephone line at the beginning of all telephone calls from equipment so equipped, e.g., as shown in FIG. 1, so as to clear any erroneous speakerphone indications that the other party's telephone system may have.

Figure 2:
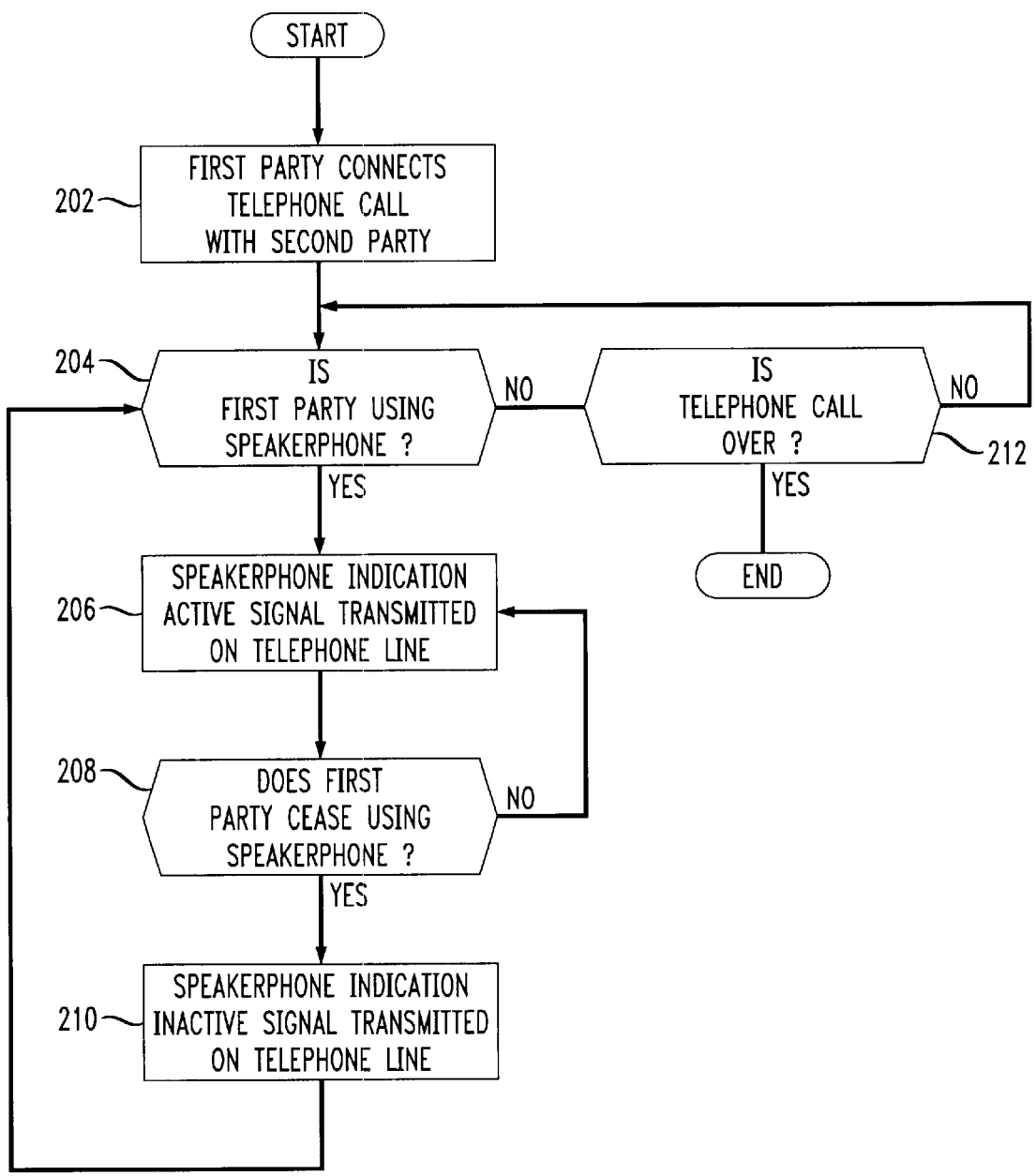
FIG. 2 is a flow chart illustrating an exemplary process by which a telephone system having a speakerphone feature such as that shown in FIG. 1 indicates to another party when they have a speakerphone feature enabled.

FIG. 2 shows a process flow chart of an exemplary operation of a telephone system 10 such as that shown in FIG. 1 having a speakerphone indication feature, in accordance with the principles of the present invention.

In particular, with reference to FIG. 2, a first party using the telephone system 10 connects a telephone call with a second party in step 202.

In decision step 204, it is determined whether/when the first party begins use of the speakerphone feature of their telephone system 10.

In step 206, if the speakerphone feature of the telephone system 10 is activated, a speakerphone indication active signal is transmitted over the telephone line to the other party (or parties in a conference call).

In decision step 208, it is determined whether/when the first party ceases use of the speakerphone feature of their telephone system 10.

In step 210, when the first party is first detected as no longer using their speakerphone feature, the speakerphone indication transmit module 24 causes a speakerphone indication inactive signal to be transmitted on the telephone line to the second party.

The telephone call is continually monitored by returning to step 204, where it is determined whether or not the first party again initiates the speakerphone feature of their telephone system 10.

In decision step 212, it is determined when the telephone call is completed.

Preferably, the telephone call is monitored to determine if a speakerphone feature becomes activated, and/or to cease such monitoring upon completion of the telephone call.

Although the disclosed embodiments relate to speakerphone indication active and inactive signals sent over the telephone line on which the voice conversation is taking place, the principles of the present invention relate equally to transmission of the speakerphone indication active and/or inactive signals transmitted over a dedicated data channel.

While the invention has been described with reference to the exemplary embodiments thereof, those skilled in the art will be able to make various modifications to the described embodiments of the invention without departing from the true spirit and scope of the invention.

What is claimed is:

1. A telephone system, comprising:
   a speakerphone; and
   a speakerphone indication transmit module adapted to cause a speakerphone indication active signal to be transmitted over a telephone line to another party upon activation of said speakerphone.

2. The telephone system according to claim 1, further comprising:
   a speakerphone indicator adapted to indicate activation of a speakerphone by said another party at the other end of said telephone line.

3. The telephone system according to claim 2, wherein:
   said speakerphone indicator is an LED.

4. The telephone system according to claim 2, wherein:
   said speakerphone indicator is an LCD display.

5. The telephone system according to claim 1, further comprising:
   a speakerphone indication receive module adapted to receive and decode a speakerphone indication active signal from said another party.

6. The telephone system according to claim 1, wherein:
   said speakerphone active indication signal is adapted for transmission after a telephone call has been established with said another party.

7. The telephone system according to claim 1, wherein:
   said speakerphone active indication signal is repeatedly transmitted during a duration of a telephone call with said another party.

8. The telephone system according to claim 1, wherein said speakerphone active indication signal comprises:
   a single tone.

9. The telephone system according to claim 1, wherein said speakerphone active indication signal comprises:
   a DTMF tone.

10. The telephone system according to claim 1, wherein said speakerphone active indication signal comprises:
    frequency shift keying (FSK) information.

11. The telephone system according to claim 1, wherein:
    said speakerphone active indication signal is transmitted to said another party via a dedicated data channel.

12. The telephone system according to claim 1, wherein:
    said speakerphone indication transmit module is further adapted to cause a speakerphone indication inactive signal to be transmitted over said telephone line to said another party upon cessation of said speakerphone feature.

13. A method for transmitting a status of speakerphone feature usage by a first party to a second party of a telephone call upon use of a speakerphone feature, comprising:
    establishing a telephone call between a first party and a second party;
    activating said speakerphone feature on a telephone system used by said first party; and
    transmitting said speakerphone active indication signal to said called party.

14. The method for transmitting a status of speakerphone feature usage by a first party to a second party of a telephone call upon use of a speakerphone feature according to claim 13, wherein:
    said speakerphone active indication signal is transmitted over a telephone line carrying said telephone call.

15. The method for transmitting a status of speakerphone feature usage by a first party to a second party of a telephone call upon use of a speakerphone feature according to claim 13, further comprising:
    transmitting a speakerphone inactive indication signal to said second party upon termination of said speakerphone feature by said first party.

16. The method for transmitting a status of speakerphone feature usage by a first party to a second party of a telephone call upon use of a speakerphone feature according to claim 13, wherein:
    said speakerphone active indication signal is transmitted to said second party repeatedly during a duration of said telephone call between said first party and said second party.

17. The method for transmitting a status of speakerphone feature usage by a first party to a second party of a telephone call upon use of a speakerphone feature according to claim 13, wherein:
    said speakerphone active indication signal is transmitted to said called party using a dual tone multiple frequency (DTMF) tone.

18. The method for transmitting a status of speakerphone feature usage by a first party to a second party of a telephone call upon use of a speakerphone feature according to claim 13, wherein:
    said speakerphone active indication signal is transmitted to said called party using frequency shift keying (FSK).

19. The method for transmitting a status of speakerphone feature usage by a first party to a second party of a telephone call upon use of a speakerphone feature according to claim 13, wherein:

said speakerphone active indication signal is transmitted to said called party using a dedicated data channel.

20. The method for transmitting a status of speakerphone feature usage by a first party to a second party of a telephone call upon use of a speakerphone feature according to claim 19, wherein:

said dedicated data channel is an ADSL channel.

21. The method for transmitting a status of speakerphone feature usage by a first party to a second party of a telephone call upon use of a speakerphone feature according to claim 13, further comprising:

displaying at a telephone system used by said second party an indication of speakerphone use by said first party.

22. Apparatus for transmitting a status of speakerphone feature usage by a first party to a second party of a telephone call upon use of a speakerphone feature, comprising:

means for establishing a telephone call between a first party and a second party;

means for activating said speakerphone feature on a telephone system used by said first party; and means for transmitting said speakerphone active indication signal to said called party.

23. The apparatus for transmitting a status of speakerphone feature usage by a first party to a second party of a telephone call upon use of a speakerphone feature according to claim 22, wherein:

said means for transmitting transmits said speakerphone active indication signal over a telephone line carrying said telephone call.

24. The apparatus for transmitting a status of speakerphone feature usage by a first party to a second party of a telephone call upon use of a speakerphone feature according to claim 22, further comprising:

means for transmitting a speakerphone inactive indication signal to said second party upon termination of said speakerphone feature by said first party.

25. A telephone system, comprising:

a speakerphone; and a speakerphone indicator adapted to indicate activation of a far end speakerphone by another party at an opposite end of a telephone line from said telephone system.

* * * * *